United States Patent
Hung et al.

(10) Patent No.: US 12,537,078 B2
(45) Date of Patent: Jan. 27, 2026

(54) SYSTEM AND METHOD FOR AUTOMATICALLY GENERATING CARE RECORD

(71) Applicant: Industrial Technology Research Institute, Hsinchu (TW)

(72) Inventors: Shang-Chih Hung, Hsinchu County (TW); Jian-Hong Liu, Kaohsiung (TW); Ho-Hsin Lee, Hsinchu (TW); Jian-Ren Chen, Hsinchu (TW); Cheng-Chieh Chiang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 989 days.

(21) Appl. No.: 17/561,987

(22) Filed: Dec. 26, 2021

(65) Prior Publication Data
US 2023/0178191 A1    Jun. 8, 2023

(30) Foreign Application Priority Data
Dec. 7, 2021    (TW) .................................. 110145667

(51) Int. Cl.
*G16H 10/60*    (2018.01)
*A61B 5/11*    (2006.01)
(Continued)

(52) U.S. Cl.
CPC .......... *G16H 10/60* (2018.01); *A61B 5/1128* (2013.01); *G06V 10/25* (2022.01); *G06V 10/82* (2022.01);
(Continued)

(58) Field of Classification Search
CPC .................................................... G16H 10/60
See application file for complete search history.

(56) References Cited

U.S. PATENT DOCUMENTS

| 9,867,480 B2 | 1/2018 | Doering et al. |
| 10,874,332 B2 | 12/2020 | Glazer et al. |

(Continued)

FOREIGN PATENT DOCUMENTS

| CN | 102236781 | 11/2011 |
| CN | 104217529 | 12/2014 |

(Continued)

OTHER PUBLICATIONS

"Office Action of Taiwan Counterpart Application", issued on Aug. 2, 2022, p. 1-p. 3.

*Primary Examiner* — Jay M. Patel
(74) *Attorney, Agent, or Firm* — JCIPRNET

(57) ABSTRACT

A system and method for automatically generating a care record are provided, which are suitable for a baby bed cover. The system includes an image capturing device and a processor. The image capturing device captures a real-time image of a baby in the baby bed. The processor is configured to receive the real-time image and detects whether an abnormal event occurs in the real-time image. The processor detects an opening time and a closing time of the bed cover to obtain a start and end time of a care operation. The processor recognizes an abnormal event type according to the abnormal event, selects a care record template according to the abnormal event type, and generates a care record according to an occurrence time of the abnormal event, the abnormal event type, the start and end time of the care operation, and the care record template.

12 Claims, 3 Drawing Sheets

(51) Int. Cl.
    *G06V 10/25*          (2022.01)
    *G06V 10/82*          (2022.01)
    *G06V 20/52*          (2022.01)
    *G06V 40/16*          (2022.01)
    *G16H 40/67*          (2018.01)

(52) U.S. Cl.
    CPC ............ *G06V 20/52* (2022.01); *G06V 40/167* (2022.01); *G16H 40/67* (2018.01)

(56) References Cited

U.S. PATENT DOCUMENTS

| | | | |
|---|---|---|---|
| 2012/0157757 A1 | 6/2012 | Ten Eyck et al. | |
| 2017/0108236 A1* | 4/2017 | Guan | F24F 11/52 |
| 2018/0053392 A1* | 2/2018 | White | A61B 5/1128 |
| 2018/0053393 A1* | 2/2018 | White | A61B 5/725 |
| 2019/0098260 A1* | 3/2019 | Glazer | G06V 40/20 |
| 2019/0206062 A1* | 7/2019 | Matsuoka | A61B 5/1128 |
| 2019/0223792 A1* | 7/2019 | Dhar | A61B 5/0022 |
| 2020/0397349 A1 | 12/2020 | Fornell | |
| 2021/0005224 A1* | 1/2021 | Rothschild | H04N 9/8205 |
| 2021/0058587 A1* | 2/2021 | Glazer | A61B 5/6891 |
| 2021/0085096 A1 | 3/2021 | Juchniewicz | |

FOREIGN PATENT DOCUMENTS

| | | |
|---|---|---|
| CN | 204307024 | 5/2015 |
| TW | 201304716 | 2/2013 |
| TW | M529907 | 10/2016 |
| TW | 202016893 | 5/2020 |

\* cited by examiner

| Data field | Data content |
|---|---|
| Name of the baby | OOOOO |
| Detection time of an abnormal event | 2021-09-27 10:23:05 |
| Start time of care operation | 2021-09-27 10:24:11 |
| End time of care operation | 2021-09-27 10:26:27 |
| Name of the caretaker | XXX |
| Abnormal image | |
| Image before care operation | |
| Image after care operation | |

Record time

Caretaker

Record content

A XX event occurred on the baby XXX at XX. The caretaker XX dealt with the event at XX to [ ]. The caretaker held the baby and patted the baby's back for X minutes. After checking that there was nothing wrong, the baby was put back into the baby bed. The caretaker soothed the baby into sleep and reported to the mother. The mother replied that she was informed of the event.

Image record

Occurrence of abnormal event | Before dealing with the event | After dealing with the event

FIG. 3

SYSTEM AND METHOD FOR AUTOMATICALLY GENERATING CARE RECORD

CROSS-REFERENCE TO RELATED APPLICATION

This application claims the priority benefit of Taiwan application Ser. No. 110145667, filed on Dec. 7, 2021. The entirety of the above-mentioned patent application is hereby incorporated by reference herein and made a part of this specification.

TECHNICAL FIELD

The disclosure relates to a system and a method for automatically generating a care record when detecting a baby abnormal event, and in particular, to a system and a method for automatically generating a care record.

BACKGROUND

Caretakers in postpartum nursing care centers or maternal fetal medicine clinics have to take care of multiple babies at the same time. Their responsibilities include measuring babies' breathing and heartbeat, feeding the babies, changing diapers, administering medication, and so on, involving numerous caring tasks and a heavy workload. Apart from the caring tasks, they also need to perform some administrative duties such as filling in care records or entering evaluations of the babies' physical conditions. To smoothly proceed with their caring tasks, the caretakers usually rely on their own memory to record a caring time, caring content, and caring details, and some of them are used to recording the main points by hand-writing during the caring tasks. If it is required to spend extra time consulting other related information, it takes more time to enter the evaluations of the babies physical conditions.

During the caring period, if something abnormal occurs on the babies, the caretakers have to deal with the event and fill in the care records. However, the caretakers usually fill in the care records after all the caring tasks have been completed. With the passage of long time, mistakes or omissions tend to happen (e.g. inaccurate time or orders of the caring events are recorded, which makes it not easy to follow up) when the caretakers fill in the care records, or for convenience of filling in the care records and reducing the filling time, only simple and rough content is recorded. A current form of the care records does not meet the latest requirements of the evaluation of postpartum nursing care centers.

SUMMARY

A system for automatically generating a care record of the disclosure is applied to a baby bed and a bed cover arranged above the baby bed. The system includes an image capturing device and a processor. The image capturing device is configured on the bed cover to capture a real-time image of a baby in the baby bed. The processor is coupled to the image capturing device and is configured to receive the real-time image and detect whether an abnormal event occurs in the real-time image. The processor detects an opening time and a closing time of the bed cover to obtain a start time and an end time of a care operation. The processor recognizes an abnormal event type according to the abnormal event and selects a care record template according to the abnormal event type to correspondingly generate a care record according to an occurrence time of the abnormal event, the abnormal event type, the start time and the end time of the care operation, and the care record template.

A method for automatically generating a care record of the disclosure is applied to a baby bed and a bed cover arranged above the baby bed. The method includes the following. A real-time image of a baby in the baby bed is captured. The real-time image is received, and it is detected whether an abnormal event occurs in the real-time image. An opening time and a closing time of the bed cover are detected to obtain a start time and an end time of a care operation. An abnormal event type is recognized according to the abnormal event, and a care record template is selected according to the abnormal event type to correspondingly generate a care record according to an occurrence time of the abnormal event, the abnormal event type, a start time and an end time of the care operation, and the care record template.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 3 is a schematic diagram illustrating care process information and a care record template corresponding to an abnormal event type according to an embodiment of the disclosure.

DETAILED DESCRIPTION OF DISCLOSED EMBODIMENTS

Figure 1:
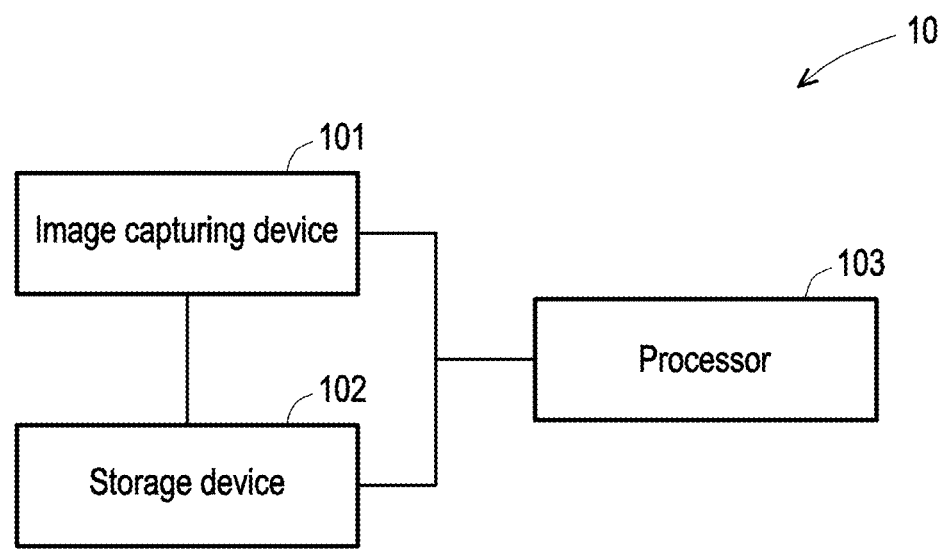
FIG. 1 is a schematic diagram of a system for automatically generating a care record according to an embodiment of the disclosure.

Some embodiments of the disclosure accompanied with the drawings will now be described in detail. In the reference numerals recited in description below, the same reference numerals shown in different drawings will be regarded as the same or similar elements. These embodiments are only a part of the disclosure and do not disclose all possible implementations of the disclosure. To be more precise, these embodiments are only examples of the appended claims of the disclosure.

The disclosure provides a system and a method for automatically generating a care record which can choose a different care record template according to a different abnormal event type to effectively increase the efficiency of a caretaker recording a care process.

In an embodiment of the disclosure, in the system for automatically generating the care record, an operation in which a processor recognizes an abnormal event type according to an abnormal event and selects a care record template according to the abnormal event type to correspondingly generate the care record according to an occurrence time of the abnormal event, the abnormal event type, a start time and an end time of a care operation, and the care record template further includes the following. The processor is further configured to obtain a name of the caretaker of the care operation, a bed cover recognition code corresponding to a baby bed, an image corresponding to the abnormal event, an image before the care operation, and an image after the care operation.

In an embodiment of the disclosure, the system for automatically generating the care record further includes a storage device. The storage device is coupled to an image capturing device and the processor and is configured to store multiple care record templates respectively corresponding to the abnormal event type and the care record.

In an embodiment of the disclosure, in the system for automatically generating the care record, an operation in which the processor is configured to receive a real-time image and detect whether the abnormal event occurs in the real-time image further includes the following. The processor is further configured to transmit a warning signal to notify the caretaker when an occurrence of the abnormal event is detected in the real-time image.

In an embodiment of the disclosure, in the system for automatically generating the care record, the operation in which the processor is configured to receive the real-time image and detect whether the abnormal event occurs in the real-time image further includes the following. The processor is further configured to detect whether the abnormal event occurs in the real time image by using a deep neural network (DNN).

In an embodiment of the disclosure, in the system for automatically generating the care record, an operation in which the processor detects an opening time and a closing time of the bed cover to obtain the start time and the end time of the care operation further includes the following. The processor is further configured to use a region of interest (ROI) to perform face detection on an abnormal image corresponding to the abnormal event and calculate a human face ratio of a baby face to the real-time image corresponding to the abnormal event to determine whether the bed cover is opened or closed according to the human face ratio. Hence, the opening time and the closing time of the bed cover are obtained.

In an embodiment of the disclosure, in the system for automatically generating the care record, the care record includes at least one of the bed cover recognition code, the name of the caretaker, the occurrence time of the abnormal event, the abnormal event type, the start time and the end time of the care operation, the abnormal image corresponding to the abnormal event, the image before the care operation, and the image after the care operation.

In an embodiment of the disclosure, in the method for automatically generating the care record, recognizing the abnormal event type according to the abnormal event to select the care record template according to the abnormal event type to correspondingly generate the care record according to the occurrence time of the abnormal event, the abnormal event type, the start time and the end time of the care operation, and the care record template further includes the following. The name of the caretaker, the bed cover recognition code corresponding to the baby bed, the abnormal image corresponding to the abnormal event, the image before the care operation, and the image after the care operation are obtained.

In an embodiment of the disclosure, the method for automatically generating the care record further includes the following. The multiple care record templates respectively corresponding to the abnormal event types and the care record are stored.

In an embodiment of the disclosure, in the method for automatically generating the care record, receiving the real-time image and detecting whether the abnormal event occurs in the real-time image further include the following. The warning signal is transmitted to notify the caretaker when the occurrence of the abnormal event is detected in the real-time image.

In an embodiment of the disclosure, in the method for automatically generating the care record, receiving the real-time image and detecting whether the abnormal event occurs in the real-time image further include the following. It is detected whether the abnormal event occurs in the real time image by using the deep neural network.

In an embodiment of the disclosure, in the method for automatically generating the care record, detecting the opening time and the closing time of the bed cover to obtain the start time and the end time of the care operation further includes the following. The region of interest is adopted to perform face detection on the abnormal image corresponding to the abnormal event and the human face ratio of the baby face to the real-time image corresponding to the abnormal event is calculated to determine whether the bed cover is opened or closed according to the human face ratio. Hence, the opening time and the closing time of the bed cover are obtained.

In an embodiment of the disclosure, in the method for automatically generating the care record, the care record includes at least one of the bed cover recognition code, the name of the caretaker, the occurrence time of the abnormal event, the abnormal event type, the start time and the end time of the care operation, the abnormal image corresponding to the abnormal event, the image before the care operation, and the image after the care operation.

Based on the above, the disclosure provides a system and a method for automatically generating the care record which can choose the different care record template according to the different abnormal event type. Without changing an existing care process of the caretaker, the care process may be rapidly and accurately recorded, and the baby abnormal event may be recorded by using the relevant real-time image. The efficiency of the caretaker recording the care process is effectively increased.

Figure 2:
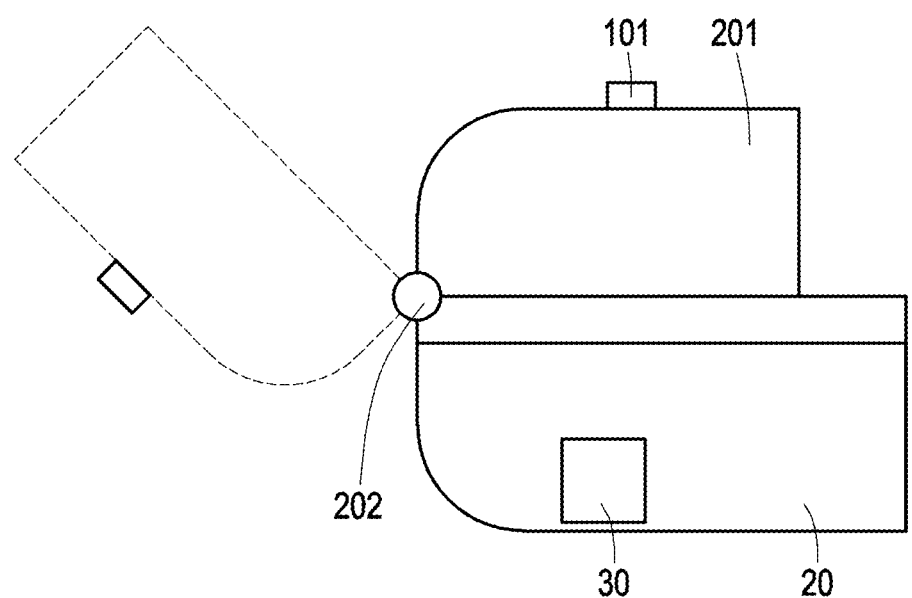
FIG. 2 is a schematic diagram of a baby bed according to an embodiment of the disclosure.

FIG. 1 is a schematic diagram of a system for automatically generating a care record according to an embodiment of the disclosure. FIG. 2 is a schematic diagram of a baby bed according to an embodiment of the disclosure.

Referring to FIG. 1 and FIG. 2, a system 10 for automatically generating a care record includes an image capturing device 101, a storage device 102, and a processor 103. The system 10 for automatically generating the care record is applied to a baby sleep capsule with a bed cover 201 arranged above as shown in FIG. 2 or a baby bed 20. The disclosure is not limited thereto.

The image capturing device 101 is configured on the bed cover 201 to capture a real-time image of a baby 30 in the baby bed 20. The image capturing device 101 is, for example, an image sensor with a charge coupled device (CCD) or a complementary metal-oxide semiconductor (CMOS) device. The image capturing device 101 may also be a digital camera or a video camera with a downward field of view (FOV) arranged at the baby bed 201; however, the disclosure is not limited to the forms of implementation.

The processor 103 is coupled to the image capturing device 101 and the storage device 102 to control an entire operation of the system 10 for automatically generating the care record. In the embodiment, the processor 103 is, for example, a central processing unit (CPU), or other programmable microprocessor, a digital signal processor (DSP), a programmable controller, an application specific integrated circuit (ASIC), a programmable logic device (PLD) or other hardware device with a computing power; however, the disclosure is not limited thereto.

The processor 103 is configured to receive a real-time image captured by the image capturing device 101 and detect whether an abnormal event occurs in the real-time image, such as abnormal events of the baby 30 in the baby bed 20 including milk spilling, the mouth and nose being blocked, neonatal jaundice, cyanosis, a cramp, or falling. In an embodiment, the processor 103 uses a deep neural network (DNN) model and a characteristic database of the baby 30 stored in the storage device 102 to recognize whether the abnormal event occurs on the baby 30 in the real-time image and transmit a warning signal to notify a caretaker to perform care operation when an occurrence of the abnormal event in the real-time image is detected.

FIG. 3 is a schematic diagram illustrating care process information and a care record template 301 corresponding to an abnormal event type according to an embodiment of the disclosure.

Referring to FIG. 1 to FIG. 3 together, the processor 103 uses a region of interest (ROI) to perform face detection on an abnormal image corresponding to the abnormal event. The processor 103 calculates a human face ratio of a baby face of the baby 30 in the baby bed 20 to the abnormal image and determines whether the bed cover 201 is opened or closed with respect to the baby bed 20 according to a relation between the human face ratio and a predetermined threshold value to obtain the opening time and the closing time of the baby bed 201 to obtain a start time and an end time of the care operation.

Specifically, in an embodiment, when the bed cover 201 rotates relative to the baby bed 20 with a hinge 202 as a rotation axis so that the bed cover 201 is away from the baby bed 20, the processor 103 calculates a minimum of the human face ratio of the baby face of the baby 30 in the baby bed 20 to the abnormal image. The bed cover 201 is opened, and the caretaker may perform the care operation for the baby 30 in the baby bed 20. After performing the care operation, when the bed cover 201 rotates relative to the baby bed 20 with the hinge 202 as the rotation axis so that the bed cover 201 approaches the baby bed 20, the processor 103 calculates a maximum of the human face ratio of the baby face of the baby 30 in the baby bed 20 to the abnormal image. The bed cover 201 is closed, and the processor 103 may obtain the opening time and the closing time of the bed cover 201 to obtain the start time and the end time of the care operation.

Referring to FIG. 3 again, the processor 103 obtains a name of the caretaker of the care operation, a bed cover recognition code corresponding to the baby bed 20, the abnormal image, and an image before the care and an image after the care operation. In an embodiment, the processor 103 recognizes an abnormal event type (e.g. an occurrence of milk spilling), the name of the caretaker (e.g. XX Lin), the bed cover recognition code (e.g. the son of XX Wang or a number), an occurrence time of the abnormal event (e.g. 2021-09-27 10:23:05), the start time and the end time of the care operation (e.g. the care operation starts at 2021-09-27 10:24:11 and ends at 2021-09-27 10:26:37), the abnormal image, and the image before the care and the image after the care operation according to the abnormal event, and the processor 103 selects the care record template 301 corresponding to the abnormal event type from the storage device 102 to correspondingly generate the care record.

The storage device 102 is, for example, any type of fixed or mobile random access memory (RAM), read only memory (ROM), flash memory, hard disk drive (HDD), solid-state drive (SDD), or other similar devices, or a combination thereof. The storage device 102 is configured to store data, a program and/or an image that may be used in the operation of the system 10 for automatically generating the care record. That is, the storage device 102 may be further configured to record multiple commands that may be executed by the processor 103.

The storage device 102 is coupled to the image capturing device 101 and the processor 103 and is configured to store multiple care record templates respectively corresponding to the abnormal event type. In an embodiment, the storage device 102 is configured to store the care record correspondingly generated by the processor 103 according to the abnormal event type, the name of the caretaker, the bed cover recognition code, the occurrence time of the abnormal event, the start time and the end time of the care operation, the abnormal image, and the image before the care and the image after the care operation and by the processor 103 selecting the care record template 301 corresponding to the abnormal event type. In an embodiment, the storage device 102 is further configured to store the abnormal image and the image before the care and the image after the care operation.

In an embodiment, the storage device 102 further includes the characteristic database storing image characteristics of the baby 30. In an operation in which the processor 103 uses the DNN model and the characteristic data of the baby 30 stored in the characteristic database to recognize whether the abnormal event occurs on the baby 30 in the real-time image, the processor 30 may analyze whether there is an image matching a certain image characteristic in the abnormal image by using the DNN model and according to the certain image characteristic (e.g. a mouth characteristic) in the characteristic database and a mouth characteristic of the baby 30 in the real-time image to recognize whether the abnormal event occurs on the baby 30 in the real-time image.

Figure 4:
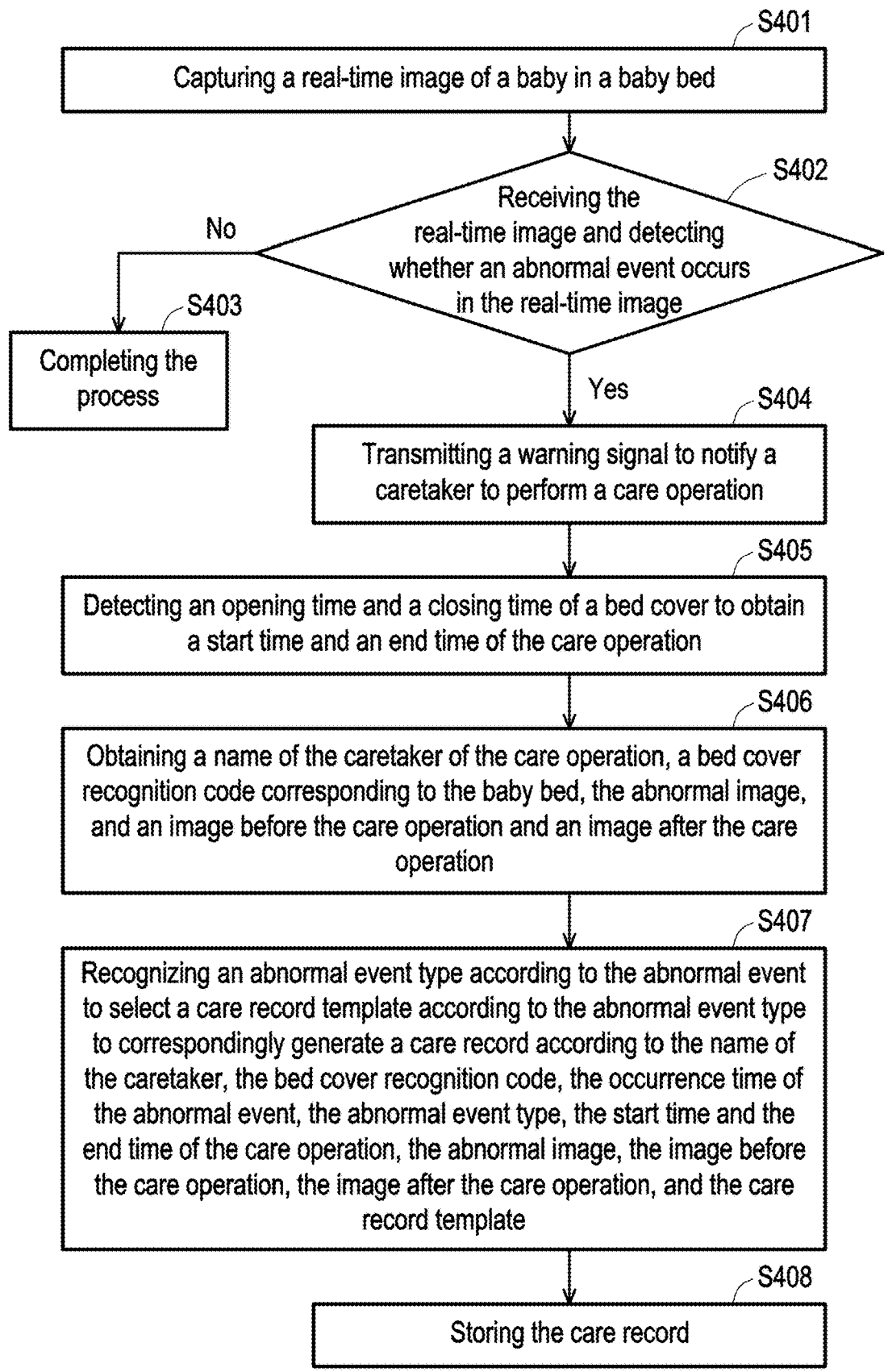
FIG. 4 is a flow chart of a method for automatically generating a care record according to an embodiment of the disclosure.

FIG. 4 is a flow chart of a method for automatically generating a care record according to an embodiment of the disclosure.

Referring to FIG. 1 and FIG. 4, the method of the embodiment is applied to the system 10 for automatically generating the care record in the embodiments above. The detailed steps of the method for automatically generating the care record of the embodiment are described below accompanied with the description of each element of the system 10 for automatically generating the care record.

First, in step S401, the image capturing device 101 captures the real-time image of the baby 30 in the baby bed 20.

In step S402, the processor 103 receives the real-time image and detects whether the abnormal event occurs in the real-time image, such as abnormal events of the baby 30 in the baby bed 20 including milk spilling, the mouth and nose being blocked, neonatal jaundice, cyanosis, a cramp, or falling. In an embodiment, the processor 103 uses the DNN model and the characteristic database of the baby 30 stored in the storage device 102 to recognize whether the abnormal event occurs on the baby 30 in the real-time image.

In step S403, if the processor 103 detects that the abnormal event does not occur in the real-time image, the process is completed.

In step S404, if the processor 103 detects the occurrence of the abnormal event in the real-time image, the processor 103 transmits the warning signal to notify the caretaker to perform the care operation.

In step S405, the processor 103 detects the opening time and the closing time of the bed cover 201 to obtain the start time and the end time of the care operation. In an embodiment, the processor 103 uses the region of interest to perform face detection on the abnormal image corresponding to the abnormal event. The processor 103 calculates the human face ratio of the baby face of the baby 30 in the baby bed 20 to the abnormal image and determines whether the bed cover 201 is opened or closed according to the human face ratio to obtain the opening time and the closing time of the baby bed 201 to obtain the start time and the end time of the care operation.

In step S406, the processor 103 obtains the name of the caretaker of the care operation, the bed cover recognition code corresponding to the baby bed, the abnormal image, and the image before the care operation and the image after the care operation.

In step S407, the processor 103 recognizes the abnormal event type according to the abnormal event to select the care record template 301 according to the abnormal event type. The processor 103 correspondingly generates the care record according to the name of the caretaker, the bed cover recognition code, the occurrence time of the abnormal event, the abnormal event type, the start time and the end time of the care operation, the abnormal image, the image before the care operation, the image after the care operation, and the care record template 301.

In step S408, the storage device 102 stores the care record. In an embodiment, the storage device 102 stores the abnormal image and the image before the care operation and the image after the care operation.

In summary of the above, the disclosure provides the system and the method for automatically generating the care record which can choose the different care record template 301 according to the different abnormal event type. Without changing the existing care process of the caretaker, the care process may be rapidly and accurately recorded, and the baby abnormal event may be recorded by using the relevant real-time image. The efficiency of the caretaker recording a care process is effectively increased.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A system for automatically generating a care record applied to a baby bed, a hinge and a bed cover arranged above the baby bed, the bed cover rotates relative to the baby bed with the hinge as a rotation axis, the system comprising:
an image capturing device with a downward field of view (FOV) configured on the bed cover to capture a real-time image of a baby in the baby bed; and
a processor coupled to the image capturing device and configured to receive the real-time image, detect whether an abnormal event occurs in the real-time image, and perform a care operation when an occurrence of the abnormal event in the real-time image is detected, detect an opening time and a closing time of the bed cover to obtain a start time and an end time of the care operation, recognize an abnormal event type according to the abnormal event, and select a care record template according to the abnormal event type to correspondingly generate a care record according to an occurrence time of the abnormal event, the abnormal event type, the start time and the end time of the care operation, and the care record template, wherein an operation in which the processor detects the opening time and the closing time of the bed cover to obtain the start time and the end time of the care operation further comprises:
the processor being further configured to use a region of interest (ROI) to perform face detection on the abnormal image corresponding to the abnormal event to obtain a baby face, obtain a human face ratio of the baby face to the abnormal image corresponding to the abnormal event, when the bed cover rotates relative to the baby bed with the hinge as the rotation axis so that the bed cover is away from the baby bed, the processor obtains a minimum of the human face ratio of the baby face to the abnormal image, the bed cover is opened, and perform the care operation, the processor obtains an opening time of the bed cover as the start time of the care operation, after performing the care operation, when the bed cover rotates relative to the baby bed with the hinge as the rotation axis so that the bed cover approaches the baby bed, the processor obtains a maximum of the human face ratio of the baby face to the abnormal image, the bed cover is closed, and the processor obtains a closing time of the bed cover as the end time of the care operation.

2. The system for automatically generating the care record according to claim 1, wherein an operation in which the processor recognizes the abnormal event type according to the abnormal event and selects the care record template according to the abnormal event type to correspondingly generate the care record according to the occurrence time of the abnormal event, the abnormal event type, the start time and the end time of the care operation, and the care record template further comprises:
the processor being further configured to obtain a name of a caretaker, a bed cover recognition code corresponding to the baby bed, an abnormal image corresponding to the abnormal event, and an image before the care operation and an image after the care operation.

3. The system for automatically generating the care record according to claim 2, the system further comprising:
a storage device coupled to the image capturing device and the processor and configured to store a plurality of care record templates respectively corresponding to the abnormal event type and the care record.

4. The system for automatically generating the care record according to claim 1, wherein an operation in which the processor is configured to receive the real-time image and detect whether the abnormal event occurs in the real-time image further comprises:
in response to an occurrence of the abnormal event being detected in the real-time image, the processor being further configured to transmit a warning signal to notify a caretaker.

5. The system for automatically generating the care record according to claim 1, wherein an operation in which the processor is configured to receive the real-time image and detect whether the abnormal event occurs in the real-time image further comprises:

the processor being further configured to detect whether the abnormal event occurs in the real-time image by using a deep neural network (DNN).

6. The system for automatically generating the care record according to claim 3, wherein the care record comprises at least one of the bed cover recognition code, the name of the caretaker, the occurrence time of the abnormal event, the abnormal event type, the start time and the end time of the care operation, the abnormal image corresponding to the abnormal event, the image before the care operation, and the image after the care operation.

7. A method for automatically generating a care record applied to a baby bed, a hinge and a bed cover arranged above the baby bed, the bed cover rotates relative to the baby bed with the hinge as a rotation axis, the method comprising:
capturing a real-time image of a baby in the baby bed by an image capturing device with a downward field of view (FOV);
receiving the real-time image and detecting whether an abnormal event occurs in the real-time image, and performing a care operation when an occurrence of the abnormal event in the real-time image is detected;
detecting an opening time and a closing time of the bed cover to obtain a start time and an end time of the care operation; and
recognizing an abnormal event type according to the abnormal event to select a care record template according to the abnormal event type to correspondingly generate a care record according to an occurrence time of the abnormal event, the abnormal event type, the start time and the end time of the care operation, and the care record template, wherein detecting the opening time and the closing time of the bed cover to obtain the start time and the end time of the care operation further comprises:
using a region of interest (ROI) to perform face detection on the abnormal image corresponding to the abnormal event and calculate a human face ratio of a baby face to the abnormal image corresponding to the abnormal event, when the bed cover rotates relative to the baby bed with the hinge as the rotation axis so that the bed cover is away from the baby bed, obtaining a minimum of the human face ratio of the baby face to the abnormal image, the bed cover is opened, and performing the care operation, obtaining an opening time of the bed cover as the start time of the care operation, after performing the care operation, when the bed cover rotates relative to the baby bed with the hinge as the rotation axis so that the bed cover approaches the baby bed, obtaining a maximum of the human face ratio of the baby face to the abnormal image, the bed cover is closed, and obtaining a closing time of the bed cover as the end time of the care operation.

8. The method for automatically generating the care record according to claim 7, wherein recognizing the abnormal event type according to the abnormal event to select the care record template according to the abnormal event type to correspondingly generate the care record according to the occurrence time of the abnormal event, the abnormal event type, the start time and the end time of the care operation, and the care record template further comprises:
obtaining a name of a caretaker, a bed cover recognition code corresponding to the baby bed, an abnormal image corresponding to the abnormal event, and an image before the care and an image after the care operation.

9. The method for automatically generating the care record according to claim 8, the method further comprising:
storing a plurality of care record templates respectively corresponding to the abnormal event type and the care record.

10. The method for automatically generating the care record according to claim 7, wherein receiving the real-time image and detecting whether the abnormal event occurs in the real-time image further comprise:
in response to an occurrence of the abnormal event being detected in the real-time image, transmitting a warning signal to notify a caretaker.

11. The method for automatically generating the care record according to claim 7, wherein receiving the real-time image and detecting whether the abnormal event occurs in the real-time image further comprise:
detecting whether the abnormal event occurs in the real-time image by using a deep neural network.

12. The method for automatically generating the care record according to claim 9, wherein the care record comprises at least one of the bed cover recognition code, the name of the caretaker, the occurrence time of the abnormal event, the abnormal event type, the start time and the end time of the care operation, the abnormal image corresponding to the abnormal event, the image before the care operation, and the image after the care operation.

* * * * *